US008234621B2

(12) United States Patent
Killisperger et al.

(10) Patent No.: US 8,234,621 B2
(45) Date of Patent: Jul. 31, 2012

(54) RULE BASED INSTANTIATION OF SOFTWARE- AND SYSTEM DEVELOPMENT PROCESSES

(75) Inventors: Peter Killisperger, Wertingen (DE); Beate Nothhelfer-Kolb, Untrhaching (DE); Thomas Stückl, München (DE)

(73) Assignee: Siemens Aktiengesellschaft, München (DE)

( * ) Notice: Subject to any disclaimer, the term of this patent is extended or adjusted under 35 U.S.C. 154(b) by 1050 days.

(21) Appl. No.: 12/218,350

(22) Filed: Jul. 15, 2008

(65) Prior Publication Data

US 2009/0235225 A1     Sep. 17, 2009

Related U.S. Application Data

(60) Provisional application No. 61/035,812, filed on Mar. 12, 2008.

(51) Int. Cl.
 *G06F 9/44* (2006.01)
 *G06F 17/00* (2006.01)
 *G06F 17/24* (2006.01)
 *G06F 17/28* (2006.01)
 *G06N 5/02* (2006.01)

(52) U.S. Cl. ........ 717/101; 717/104; 717/117; 715/228; 706/47

(58) Field of Classification Search ........................ None
See application file for complete search history.

(56) References Cited

U.S. PATENT DOCUMENTS

| | | | |
|---|---|---|---|
| 6,895,382 B1 * | 5/2005 | Srinivasan et al. ........... 705/7.17 |
| 7,020,869 B2 * | 3/2006 | Abrari et al. ................... 706/47 |
| 7,139,999 B2 * | 11/2006 | Bowman-Amuah ......... 717/101 |
| 7,409,671 B1 * | 8/2008 | Meredith et al. .............. 717/104 |
| 7,430,498 B2 * | 9/2008 | Butterfield et al. ........... 717/101 |
| 7,487,438 B1 * | 2/2009 | Withers ........................ 715/228 |
| 7,496,888 B2 * | 2/2009 | Sanjar et al. .................. 717/101 |
| 7,739,671 B1 * | 6/2010 | Hinchey et al. ............... 717/117 |
| 7,752,608 B1 * | 7/2010 | Hinchey et al. ............... 717/117 |
| 2004/0078777 A1 * | 4/2004 | Bahrami ....................... 717/101 |
| 2007/0094205 A1 * | 4/2007 | Yu et al. ......................... 706/47 |
| 2007/0094207 A1 * | 4/2007 | Yu et al. ......................... 706/47 |
| 2007/0198968 A1 * | 8/2007 | Shenfield et al. ............. 717/104 |
| 2009/0094575 A1 * | 4/2009 | Vieira et al. .................. 717/104 |

OTHER PUBLICATIONS

Rob Davis et al, Getting Started with BPM—practical experiences in process modelling and management, Nov. 14, 2007, [Retrieved on Nov. 23, 2011]. Retrieved from the internet: <URL: http://www.ids-scheer.com/set/6602/Getting%20Started%20with%20BPM%20%20Master%20Class_Rob%20Davis.pdf>, pp. 1-146.*

Stephen A. White et al, XPDL and BPMN, 2003, Workflow Handbook 2003, [Retrieved on Nov. 23, 2011]. Retrieved from the internet: <URL: http://www.bpmn.org/Documents/XPDL_BPMN.pdf>, pp. 221-238, Total pp. 18.*

(Continued)

*Primary Examiner* — Don Wong
*Assistant Examiner* — Anibal Rivera

(57) ABSTRACT

A method, system and a computer readable medium for performing a rule based instantiation of a generic software and/or system development process to provide a project specific implemented instantiated process. The proposed approach provides a gradual way to provide an implemented instantiated process adapted to project specific needs by using a staggered instantiation mode. The approach distinguishes between high level instantiation and detailed instantiation depending on the nature of the instantiation operation. The approach is flexibly applicable to software and systems development processes and the set of instantiation operations is extendable.

20 Claims, 7 Drawing Sheets

OTHER PUBLICATIONS

QPR et al, QPR PorcessGuide BPMN Modeling Guide, 2007, [Retrieved on Nov. 23, 2011]. Retrieved from the internet: <URL: http://www.inst-informatica.pt/servicos/informacao-e-documentacao/biblioteca-digital/gestao-de-si-ti-1/bpm/QPR%20ProcessGuide%20-%20BPMN%20Modeling%20Guide.pdf>, pp. 1-33, Total pp. 36.*

Dimitrios Georgakopoulos et al., An Overview of workflow Management: From Process Modeling to Workflow Automation Infrastructure, 1995, [Retrieved on Mar. 30, 2012]. Retrieved from the internet: <URL: http://www.springerlink.com/content/x0641672wj346440/fulltext.pdf> 32 Pages (120-153).*

Marlon Dumas et al., UML Activity Diagrams as a Workflow Specification Language, 2001, [Retrieved on Mar. 30, 2012]. Retrieved from the internet: <URL: http://www.springerlink.com/content/67amfuh5lvnwu22p/fulltext.pdf> 15 Pages (77-90).*

Hasan Davulcu et al., Logic Based Modeling and Analysis of Workflows, 1998, [Retrieved on Mar. 30, 2012]. Retrieved from the internet: <URL: http://dl.acm.org/citation.cfm?id=275491> 9 Pages (25-33).*

Aalst, W. and Hee, K. (2004). Workflow Management-Models, Methods, und Systems. The MIT Press.; Others.

Alexander, L. and Davis, A. (1991). Criteria for Selecting Software Process Models. In Proceedings of the Fifteenth Annual International Computer Software und Applications Conference, pp. 521-528.; Others.

Basili, V. and Rombach, H. (1991). Support for comprehensive reuse. Software Engineering Journal, 6(5):303-316; Others.

Becker, U., Hamann, D., and Verlage, M. (1997). Descriptive Modeling of Software Processes. In Proceedings of the Third Conference on Software Process Improvement (SPI '97).; Others.

BMI (2004). The new V-Modell XT—Development Standard for IT Systems of the Federal Republic of Germany. URL: http://www.v-modell-xt.de (accessed Aug. 4, 2007; Others.

Boehm, B. (1976). Software Engineering. IEEE Transactions on Computers, 25(12): 1226-1241.; Others.

Boehm, B. and Belz, F. (1990). Experiences With the Spiral Model as a Process Model Generator. In Proceedings of the 5th International Software Process Workshop 'Experience with Software Process Models', pp. 43-45.; Others.

Bowers, J., May, J., Melander, E., and Baarman, M. (2002). Tailoring XP for Large System Mission Critical Software Development. In Wells, D. and Williams, L., editors, Extreme Programming und Agile Methods—XP/Agile Universe 2002, Second XP Universe Conference Chicago, vol. 2418 of LNCS, pp. 100-1 11.; Others.

Fitzgerald, B., Russo, N., and O'Kane, T. (2000). An empirical study of system development method tailoring in practice. In Proceedings of the Eighth European Conference on Information Systems, pp. 187-194.; Others.

Fontana, A. and Frey, J. (1994). Handbook of Qualitative Research, chapter Interviewing: The Art of Science, pp. 361-376. Sage Publications.; Others.

Ginsberg, M. and Quinn, L. (1995). Process tailoring and the software Capability Maturity Model. Technical report, Software Engineering Institute (SEI).; Others.

IEEE (1992). 1074-1991 IEEE Standard for Developing Software Life Cycle Processes. Software Engineering Standards Subcommittee of the Technical Committee on Software Engineering of the IEEE Computer Society.; Others.

ISO/IEC (1998). ISO/IEC 15504-9 Technology Software Process Assessment Part 9: Vocabulary.; Others.

Jaufman, O. and Münch, J. (2005). Acquisition of a Project-Specific Process. In PROFES, pp. 328-342.; Others.

Osterweil, L. J. (1987). Software Processes Are Software Too. In ICSE, pp. 2-13.; Others.

Pedreira, O., Piattini, M., Luaces, M., and Brisaboa, N. (2007). A Systematic Review of Software Process Tailoring. ACM SIGSOFT Sofware Engineering Notes, 32(3): 1-6.; Others.

Reichert, M. and Dadam, P. (1998). ADEPTflex—Supporting Dynamic Changes of Workflows Without Losing Control. J. Intell. Inf. Syst., 10(2):93-129.; Others.

Rinderle, S., Reichert, M., and Dadam, P. (2004). Correctness criteria for dynamic changes in workflow Systems—a survey. Data Knowl. Eng., 50(1):9-34.; Others.

Scheer, A.-W. (2000). ARIS—Business Process Modeling. Springer, 3rd edition.; Others.

Simmons, R. (2002). Researching Social Life, chapter Questionaires, pp. 85-104. Sage Publications, 2nd edition.; Others.

Williams, L. and Cockburn, A. (2003). Agile Software Development: It's about Feedback and Change. IEEE Computer, 36(6):39-43.; Others.

Yoon, 1.-C., Min, S.-Y., and Bae, D.-H. (2001). Tailoring and Verifying Software Process. In APSEC, pp. 202-209.; Others.

Zmud, R. W. (1997). Remarks from MIS Quarterly Editor. MIS Quarterly, 21(1):V-VII.; Others.

D. Beer, J. Dümmler and G. Rünger: Transformation ereignisgesteuerter Prozessketten in Workflowbeschreibungen im XPDL-Format., Forschungsbericht, TU Chemnitz, 2006.; Others.

B. Boehm. A spiral model of Software development and enhancement SIGSOFT, 1 1 (4): 14-24, 1986.; Others.

B.. Boehm. A Spiral Model of Software Development and Enhancement. IEEE Computer, 21(5):61-72, 1988.; Others.

R. Davis and R. Bravander. ARIS Desgin Plattform—Getting Started with BPM. Springer, 2007.; Others.

FSUIT. Hermes Management and Execution of projects in information and communications—Foundations. Swiss Federal Strategy Unit for Information Technology (FSUIT), 2003.; Others.

IDS-Scheer, Airs toolset, URL: http://www2.ids-scheer.com/international/english/products/arisdesignplatform/49630 (accessed: Jul. 17, 2007; Others.

Method Park. Project Kit. URL: http://www.methodpark.de/de/projektkit/Ueberblick-110.html (accessed Jan. 14, 2008),Others.

W. W. Royce. Managing the Development of Large Software Systems: Concepts and Techniques. In ICSE, pp. 328-339, 1987.; Others.

K. Schwaber. Scrum Development Process. In OOPSLA'95 Workshop on Business Object Design and Implementation, 1995.; Others.

I. Sommerville. Software Engineering. Addison-Wesley, 1992.; Others.

* cited by examiner

RULE BASED INSTANTIATION OF SOFTWARE- AND SYSTEM DEVELOPMENT PROCESSES

CROSS REFERENCE TO RELATED APPLICATIONS

This application claims the benefits of U.S. Provisional Application No. 61/035,812, filed Mar. 12, 2008. This US Provisional Application is incorporated by reference herein in its entirety.

FIELD OF THE INVENTION

The invention generally relates to a method, system, and computer readable medium for rule based instantiation and transformation of a generic software and/or system development process to provide a project specific instantiated process.

BACKGROUND OF THE INVENTION

In order to improve software project practice, a number of software process models have been suggested in literature and tested in practice. According to ISO 15504 (ISO/IEC. ISO/IEC 15504-9 Technology Software Process Assessment Part 9: Vocabulary, 1998) a software process is "the process or a set of processes used by an organisation or project to plan, manage, execute, monitor, control and improve its software related activities". Some of the best known software process models are the waterfall-model (W. W. Royce, "Managing the Development of Large Software Systems: Concepts and Techniques", in ICSE, pages 328-339, 1987), the spiral-model (B. Boehm, "A spiral model of Software development and enhancement", SIGSOFT, 11 (4):14-24, 1986) or agile approaches like Scrum (K. Schwaber, "Scrum Development Process", in OOPSLA'95 Workshop on Business Object Design and Implementation, 1995).

In early software process approaches it was thought that a perfect process can be developed which fits all software developing organisations and all types of projects, but every project has individual needs which have to be accommodated. Therefore, the description of a general solution (i.e. the software process model) has to be adapted in order to be applicable to individual problems. Early approaches to tackle this issue can be found by B. Boehm or by L. C. Alexander and A. M. Davis.

B. Boehm (B. Boehm and F. Belz, "Experiences With The Spiral Model As A Process Model Generator", in Proceedings of the 5th International Software Process Workshop 'Experience with Software Process Models', pages 43-45, 1990) used the Spiral Model to develop project specific software processes. In 1991, Alexander and Davis (L. C. Alexander and A. M. Davis, "Criteria for Selecting Software Process Models", in Proceedings of the Fifteenth Annual International Computer Software and Applications Conference, pages 521-528, 1991) described 20 criteria upon which the best suited process model for a project can be selected.

Since then many different adaptation approaches have been proposed, but none has become a de facto standard in practice. For instance, Bowers et al. (J. Bowers, J. May, E. Melander, and M. Baarman, "Tailoring XP for Large System Mission Critical Software Development", in D. Wells and L. Williams, editors, Extreme Programming and Agile Methods—XP/Agile Universe 2002, Second XP Universe Conference Chicago, volume 2418 of LNCS, pages 100-111, 2002) describe the adaptation of the agile software process XP to a project.

Jaufman and Muench (O. Jaufman and J. Muench, "Acquisition of a Project-Specific Process", in PROFES, pages 328-342, 2005) propose the Emergent Process Acquisition method which creates a project specific process by choosing the most suitable model from a database and by adapting it further. The latter is done by adapting the Meta model of the process by adding and deleting attributes. Afterwards the remaining attributes of the process are instantiated. Thereby the focus is on milestones and on activities and artifacts which have to be executed and created for the milestone. This approach is only cumbersomely applicable to software processes.

The instantiation approach of Yoon et al. (II-Chul Yoon, Sang-Yoon Min, and Doo-Hwan Bae, "Tailoring and Verifying Software Process", in APSEC, pages 202-209, 2001) uses processes depicted as Activity-Artifact-Graphs. Activities have a name, type, input and output artifacts and are consequently connected by artifacts. Semi automated addition and deletion of activities and artifacts is possible as well as a split and merge of activities. Furthermore syntax checks are available helping process designers maintain consistency when adapting a process. The concept was implemented by using a Process-Management-Tool working on the basis of Petri-Nets. The approach developed by Yoon et al. cannot be directly used for the instantiation of complex processes, because the structure of the process used by Yoon is much simpler.

The prior art approaches for instantiating or tailoring general processes to project specific needs adhere to inherent disadvantages in respect of insufficient visualization and tool support. This leads to imperfect efficiency, because manual adaptation is often necessary which is time consuming and expensive.

SUMMARY OF THE INVENTION

One aspect of the invention is a method for rule based instantiation of a generic software and/or system development process to provide a project specific instantiated process, the method comprising:

providing a reference process describing a workflow for software and/or system development, wherein the workflow is described by a modeling language;

high-level instantiating the reference process, wherein the high-level instantiating is based on project characteristics which do not change frequently;

detailed instantiating the reference process, wherein the detailed instantiating comprises adapting the process on short-term process needs; and providing a project specific instantiated process based on high-level instantiating and detailed instantiating the reference process, wherein the method steps of high-level instantiating and detailed instantiating are based on the same instantiation operations.

Another aspect of the invention is a system for performing a method for rule based instantiation of a generic software and/or system development process to provide a project specific instantiated process, the system comprising:

a mechanism for providing a reference process describing a workflow for software and/or system development, wherein the workflow is described by a modeling language;

a mechanism for high-level instantiating the reference process, wherein the high-level instantiating is based on project characteristics which do not change frequently;

a mechanism for detailed instantiating the reference process, wherein the detailed instantiating comprises a short-term aligning of the process on alterable process requirements; and a mechanism for providing a project specific instantiated process based on high-level instantiating and detailed instantiating the reference process, wherein the instantiation operations for high-level instantiating are an aggregation of the instantiation operations for detailed instantiating.

A further aspect of the invention is a computer readable medium, having a program recorded thereon, wherein the program when executed is to make a computer execute the method steps:

providing a reference process describing a workflow for software and/or system development, wherein the workflow is described by a modeling language;

high-level instantiating the reference process, wherein the high-level instantiating is based on project characteristics which do not change frequently;

detailed instantiating the reference process, wherein the detailed instantiating comprises instantly adapting the process on short-term process requirements; and providing a project specific instantiated process based on high-level instantiating and detailed instantiating the reference process, wherein the method steps of high-level instantiating and detailed instantiating are based on the same instantiation operations.

BRIEF DESCRIPTION OF THE DRAWINGS

The above-mentioned and other concepts of the present invention will now be addressed with reference to the drawings of the preferred embodiments of the present invention. The shown embodiments are intended to illustrate, but not to limit the invention. The drawings contain the following figures, in which like numbers refer to like parts throughout the description and drawings and wherein.

DESCRIPTION OF THE PREFERRED
EMBODIMENTS

Figure 1:
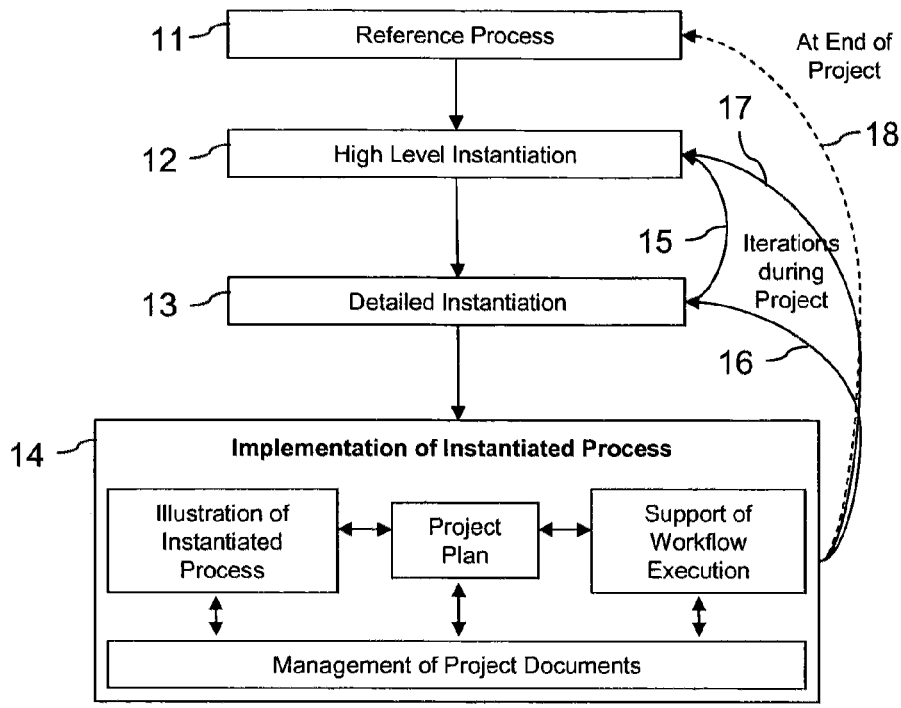
FIG. 1 shows a schematic block diagram of the general framework of the invention.

FIG. 1 shows a schematic block diagram of the general framework of the inventive approach to derive a project dedicated, instantiated development process from a general reference process.

Starting with the reference process 11, first a high level instantiation 12 is conducted, followed by a gradual detailed instantiation 13. The result is a project specific process 14 which is implemented as process visualization or illustration, project plan, workflow support and management of project artifacts. The arrows 16, 17 leading back from the project specific instantiated and implemented process 14 to the high level instantiation stage 12 and to the detailed instantiation stage 13 indicate the iterative character of the approach. Iterative instantiation is proposed because it is hardly possible to completely define a project specific process already at the start of a project. A main reason is the volatile nature of software and system development. It may also be necessary to adjust the process during projects to achieve optimal performance. The arrow 15 from detailed instantiation stage 13 to the high level instantiation stage 12 indicates that there can be also an iterative character between the detailed instantiation stage 13 and the high level instantiation stage 12. The dashed arrow 18 leading from the implementation to the reference process symbolizes the continuous improvement of the reference process on the basis of lessons learned.

The reference process 11 is a generic description of the workflow for the development of software or systems and used as the main input for the instantiation stages 12, 13. The reference process 11 can be described by using the semi-formal modeling language Event-Driven-Process-Chains (EPC) which can be extended by associated Function-Allocation-Diagrams (FAD). Event-Driven-Process-Chains and Function-Allocation-Diagrams can be provided manually by Software or Systems Engineers or Architects or they can be provided as exports (e.g. in the XML format (Extended Markup Language)) from process modeling tools.

High level Instantiation 12 is a first step towards a project specific software process on the basis of project characteristics and information which can be already defined at the start of a project and do not change frequently. It includes a first adaptation of the structure of the process by e.g. cutting away not needed parts. High Level Instantiation 12 is done at the start of a project and can be rerun during the project in case characteristics of the project change severely. Because adaptation decisions are predefined they can be approved by Quality Assurance (QA) when they are defined and can be applied without any further approval. Advantageously tool support should be used for assuring consistency of the resulting process structure.

Detailed instantiation 13 is done frequently during the project for the upcoming process activities. The time span or number of activities which can be instantiated in detail has to be as short as accurate estimations of the future can be made and has to be redone if unforeseen changes occur. Detailed instantiation 13 comprises not only the deletion of not needed process parts but also operations like the selection of pathways, the addition of objects and the duplication of sub processes. The latter is required if for example the system to be developed is split up into the development of subsystems. For every subsystem an instance of a sub process is required. Detailed instantiation 13 comprises for instance detailed resource allocation including the assignment of persons to activities. Detailed instantiation 13 is conducted by executing single instantiation operations. Instantiation decisions are advantageously supported by tools, and documented and approved by Quality Assurance (QA). Advantageously tool support should be used for assuring consistency of the resulting process structure due to the complexity and dependencies in development processes.

The instantiated process 14 is implemented as process visualization (illustration), project plan, workflow support and management of project artifacts. These components depend highly on each other and therefore have to collaborate intensively. Collaboration can be accomplished by an integrated solution or by a framework of tools. A major requirement for an implementation is ensuring the consistency of data. Also in this stage advantageously tool support should be used for assuring consistency of the resulting process implementation due to the complexity and dependencies between the collaborating components.

The visualization of the instantiated process offers all information required by project members for executing activities. This comprises a description of activities, project members involved in execution, links to artifacts and their status as well as links to further information. The current status of the project has to be tracked and displayed in terms of executed activities which enables monitoring of progress and navigation to the next activities to be executed. Also links to project artifacts, project plan and to the workflow support are provided.

A project plan comprising activities and associated work products is generated on the basis of the instantiated process. Also links from the project plan to the corresponding project artifacts, activities in the process visualization and workflow support are provided.

Support for workflow execution can be implemented by workflow management systems (WFMS) for particular sub-processes. The workflow management system provides the distribution of information between people involved in a sub-process. This is advantageous if several project members are involved in a process and the responsibility of execution of activities is transferred frequently between them. These kinds of sub-processes are generally executed several times during a project and often triggered by events. Examples are processes for defect and change management, creation of specifications or reviews for milestones or quality gates. Project members are informed what they have to do and when. Links from the WMFS to project artifacts, project plan and process visualization are available.

The management of project artifacts comprises manual access to project artifacts which is necessary e.g. in follow-up projects where a great deal of artifacts can be adopted from a previous project.

In the stage Implementation of instantiated process 14 of FIG. 1, the bidirectional arrows represent the interrelationships and links between the components of this stage. Advantageously the components and interrelationships between them are supported by suitable tools.

A concept of the invention is that, although instantiation is split up in two distinct stages (high level instantiation 12 and detailed instantiation 13), both instantiation stages are based on the same principles and basic elements. The basic elements of the instantiation stages are the basic instantiation operations. They comprise all operations which influence the structure of the process or which depend on or affect other elements when instantiating the given reference process 11. For example, basic instantiation operations are: inserting an activity; deleting an activity; inserting an alternative or parallel path; selecting/deleting a path; duplicating a sub-process; associating an artifact with an activity; deleting an association of an artifact with an activity; adding an artifact to the process; removing an artifact from the process; associating an artifact with a file implementing the artifact; associating a participant with an activity; deleting an association of a participant with an activity; adding a participant to the process; removing a participant from the process; inserting a milestone; and deleting a milestone.

The number of instantiation operations can be further extended if necessary by adding new operations to the existing. Therefore the approach is flexible and can be adapted on changing demands or requirements.

Another concept of the invention is that high level instantiation 12 can be defined as an aggregation of detailed instantiation 13. This means that high level instantiation 12 can be batch processing of basic instantiation operations like they are executed in detailed instantiation 13. The only difference is that process adaptations in high level instantiation 12 are predefined, depend on the existence of particular project characteristics and are only executed at the beginning of a project or when major project characteristics change. The approach of using the same principles for both instantiation stages enables flexibility. If for instance a particular adaptation operation is not to be executed in high level instantiation any more, the operation can be easily shifted to detailed instantiation or vice versa. Project characteristics in step high-level instantiating 12 comprising: small project, medium project, large project, inhouse project, outfarm project, offshore project, high reliability projects, and the type of development process (waterfall, spiral, agile, incremental etc.).

Figure 2:
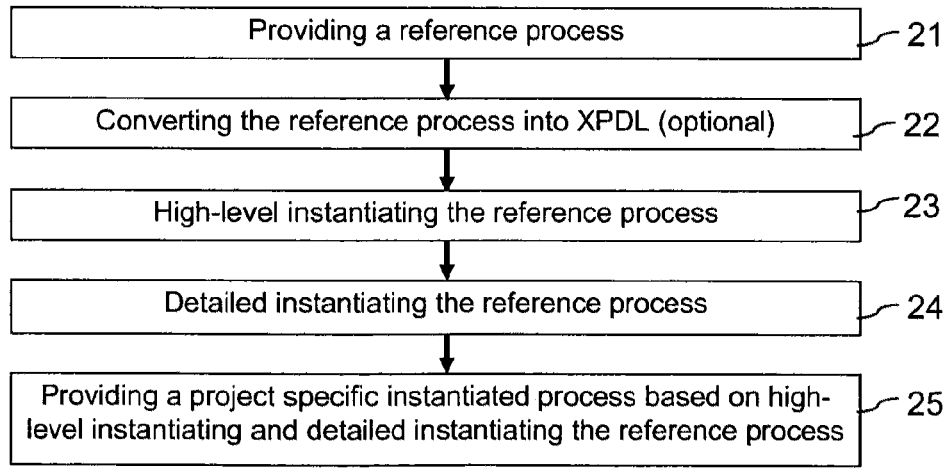
FIG. 2 shows an exemplary flowchart depicting method steps for performing the inventive method.

FIG. 2 shows an exemplary flowchart depicting the method steps for performing the inventive method for rule based instantiation of a generic software and/or system development process to provide a project specific instantiated process.

In the step "Providing a reference process" 21 a generic description of the workflow for the development of software and/or systems is provided. The reference process 11 can be described by a semi-formal modeling language. For example Event-Driven-Process-Chains (EPC) which can also be extended by associated Function-Allocation-Diagrams (FAD) is a suitable way to describe the reference process. Event-Driven-Process-Chains and Function-Allocation-Diagrams can be provided manually (e.g. by Software or Systems Engineers, Software or Systems, or Project Manager) or the can be provided as exports (e.g. in the XML format (Extended Markup Language)) from process modeling tools (e.g. ARIS).

The step "Converting the reference process into XPDL" 22 is optional and will be performed using a software tool. Having the reference process converted into XPDL is advantageous for further automatically processing the reference process, because XPDL is a standard language and widely used. XPDL was defined by the Workflow Management Coalition (WfMC) and is a XML (eXtensible Markup Language) based standard for the exchange of workflow definitions. There is a wide range of tools available for processing XPDL (e.g. Enhydra JaWE (Java Workflow Editor)). The translation from EPC to XPDL founds on the functionality offered by the tool ConVex (Converter from EPC to XPDL) developed by the Technical University Chemnitz. XPDL is by default graphically visualized with the Business Process Modeling Notation (BPMN) and can also be used as input language for business process management tools like COSA BPM Engine, IBM FileNet Business Process Manager or Oracle Warehouse Builder.

The step "High-level instantiating the reference process" 23 is a first step towards a project specific software process on the basis of project characteristics and information which can be already defined at the start of a project and are unlikely to change. Such characteristics can be e.g. the size of a project (a small project will only use a sub-set of the process) or required high reliability of the software product (or the system to be built) which requires certain activities to be added to the process. The step "High-level instantiating the reference process" 23 includes a first adaptation or alignment of the structure of the process by e.g. cutting away not needed parts. This step is done at an early phase of a project and can be rerun during the project in case characteristics of the project change severely. Because adaptation decisions are predefined they can be approved by Quality Assurance (QA) when they are defined and can be applied without any further approval. Advantageously tool support should be used for assuring consistency of the resulting process structure. The step "High-level instantiating the reference process" 23 is performed as a batch processing instantiation operations.

The step "Detailed instantiating the reference process" 24 is done frequently during the project for the upcoming process activities. The time span or number of activities which can be instantiated in detail has to be as short as accurate estimations of the future can be made and has to be redone if unforeseen changes occur. The step "Detailed instantiating the reference process" 24 comprises not only the deletion of not needed process parts but also comprises operations like the selection of pathways, the addition of objects and the duplication of sub-processes. The latter is required if for example the system to be developed is split up into the development of subsystems. For every subsystem an instance of a sub-process is required. This step 24 comprises for instance detailed resource allocation including the assignment of persons to activities. The step "Detailed instantiating the reference process" 24 is conducted by executing single basic instantiation operations. Instantiation decisions are advantageously supported by tools, and documented and approved by Quality Assurance (QA). Advantageously tool support should be used for assuring consistency of the resulting process structure due to the complexity and dependencies in development processes.

Both instantiating steps 23, 24 base upon the same principles to allow flexible handling of operations. If for instance a particular adaption operation is not to be executed in the step "High-level instantiating the reference process" 23 any more, the operation can be easily shifted to the step "Detailed instantiating the reference process" 24 or vice versa. The instantiation operations performed in step "High-level instantiating the reference process" 23 are an aggregation of the instantiation operations performed in step "Detailed instantiating the reference process" 24. The only difference is that process adaptations performed in the step "High-level instantiating the reference process" 23 are predefined, depend on the existence of particular process characteristics and are only executed at the beginning of a project or when major process characteristics change.

In the step "Providing a project specific instantiated process based on high-level instantiating and detailed instantiating the reference process" 25 an implemented instantiated process is provided as process visualization (illustration), project plan, workflow support and management of project artifacts. These components depend highly on each other and therefore have to collaborate intensively. Collaboration can be accomplished by an integrated solution or by a framework of tools. A major requirement for an implementation is ensuring the consistency of data. Also in this stage advantageously tool support should be used for assuring consistency of the resulting process implementation due to the complexity and dependencies between the collaborating components. The results of this step 25 (the representation of the instantiated process) can be adapted to process and user needs.

The approach depicted in FIG. 2 is iterative, wherein the early steps "Providing a reference process" 21, "Converting the reference process into XPDL" 22, and "High-level instantiating the reference process" 23 will normally be repeated not so frequently compared to the late steps "Detailed instantiating the reference process" 24 and "Providing a project specific instantiated process based on high-level instantiating and detailed instantiating the reference process" 25. This is because the steps 21, 22 and 23 are based on stable process characteristics which do not change frequently.

The following table shows examples of objects used to visualize the XPDL representation of the development process (object names, symbols and their corresponding XPDL representation in an XML file):

| Object Name | Symbol | XPDL representation in XML file |
|---|---|---|
| Activity | ☐ | <Activity Id="..." Name="..." StartMode="Manual" FinishMode="Manual"> |
| Start Event | ○ | <Activity Id="..." Name="..."> ... <Event > <StartEvent Trigger="none"></StartEvent> </Event> ... </Activity> |
| End Event | ○ | <Activity Id="..." Name="..."> ... <Event > <EndEvent Result="none"></StartEvent> </Event> ... </Activity> |
| XOR Split/Join | ⊗ | <Activity Id="..." Name="XOR Rule" StartMode="Automatic" FinishMode="Automatic"> ... <Split Type="XOR"> or <Join Type="XOR"> |
| AND Split/Join | ⊕ | <Activity Id="..." Name="AND Rule" StartMode="Automatic" FinishMode="Automatic"> ... <Split Type="AND"> or <Join Type="AND"> |
| OR Split/Join | ◉ | <Activity Id="..." Name="OR Rule" StartMode="Automatic" FinishMode="Automatic"> ... <Split Type="AND"> <Join Type="AND"> |

XPDL has no implicit construct for OR splits and joins. OR splits are implemented by using a AND construct with conditions. The presented invention provides a way to instantiate software or system development processes gradually by using a staggered approach for transforming process models or workflow descriptions. In each instantiation stage the same principles are applied, therefore the same instantiation operations can be applied in each instantiation stage. The set of the instantiation operations is in principle open-ended and upgradeable, this improves the flexibility for the user.

The described approach offers a standardized way to adapt reference processes to project specific needs. The adaptation and resulting instantiated process depends less on the experience and preference of the performing expert and better process adherence is fostered. Semi-automated adaptation ensures maintenance of consistency when instantiating complex processes. In addition, it is less time consuming and less expensive than manual instantiation. Due to the existence of an instantiated software process model, project participants in all levels (in Management, Development, Engineering, Testing, Maintenance) can be better supported in executing processes by providing process visualization, workflow support, artifact management and management of plans. It helps to reduce the various perceptions and applications of the process and implies more effective and efficient software projects. Decisions made in the adaptation of the reference process to project specific needs are documented and therefore are reproducible. Standardization of the instantiation approach enables easier and better improvement of the reference process. Organization-specific arrangement of instantiation operations for high level instantiation can be done by domain experts without involvement of IT specialists.

Using rule based basic instantiation operations for high level instantiation and detailed instantiation provides high flexibility in matters of (1) Grouping instantiation operations to adapt reference processes to organization-specific types of projects (e.g. size of project, security-relevance etc.)

(2) Moving operations from high level instantiation to detailed instantiation or the other way round, (3) Extending the system by implementation of additional instantiation operations.

By arranging instantiation operations to adapt reference processes to standardized project types, QA (Quality Assurance) has to approve the adaptations only once and high level instantiation can be run without any delay caused by QA.

Figure 3:
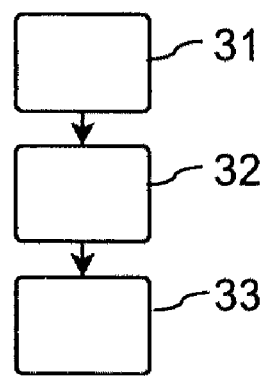
FIG. 3 shows a first example for applying an instantiation operation.

FIG. 3 shows a first example for applying an instantiation operation to transform a process model. The deletion of an activity 32 with an activity as predecessor 31 and followed by an activity 33 has no consequences as long as the activity 32 to be deleted does not create or update an artifact which is needed by another activity.

The following rules are effective to delete an activity 32 which is in between a predecessor activity 31 and a successor activity 33:

If the activity to be deleted does not create/update an artifact, it can be deleted.

If the activity to be deleted does create/update an artifact but the artifact is not required by any other activity to be executed after the activity to be deleted, the artifact and the association of the artifact with the activity can be deleted.

If the activity to be deleted does create/updated an artifact which is required by another activity, either the activity cannot be deleted or the creation/updating of the artifact has to be moved to an activity which is executed before the activity requiring the artifact is started, otherwise a dead lock could emerge.

Figure 4:
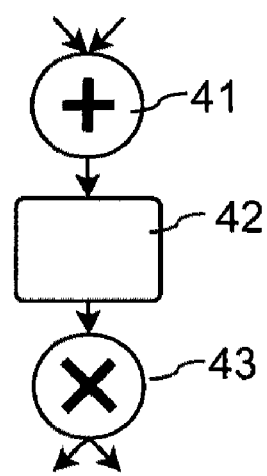
FIG. 4 shows a second example for applying an instantiation operation.

FIG. 4 shows a second example for applying an instantiation operation to transform a process model. If an activity 42 to be deleted has a preceding AND join 41 and is followed by a XOR split 43, the consequence of deleting the activity 42 is that the XOR split 43 cannot decide which path to follow, because the performer of the activity 42 preceding the XOR split 43 has to make the decision (has to set variables which are interpreted by the XOR split 43).

In addition to the rules presented in FIG. 3 the following rules have to be taken into account when deleting the activity 42 in FIG. 4:

The decision making for the XOR split 43 has to be moved to the last activity before the activity to be deleted. Because the node preceding the activity to be deleted is a AND join 41, decision making is moved further up the path. However, AND joins have at least two predecessors and it is not guaranteed that all predecessors make their decision at the same time (and location) which can cause a not optimal decision or in worst case inconsistencies. Therefore the activity cannot be deleted but only replaced by an auxiliary activity deciding upon the path to follow on the basis of information delivered by all preceding activities of the AND join.

These rules can be implemented in a system supporting the user by adapting a software process by means of high level instantiation and detailed instantiation. High level instantiation is done by executing several basic instantiation operations as a batch. In detailed instantiation the operations are executed individually.

Figure 5:
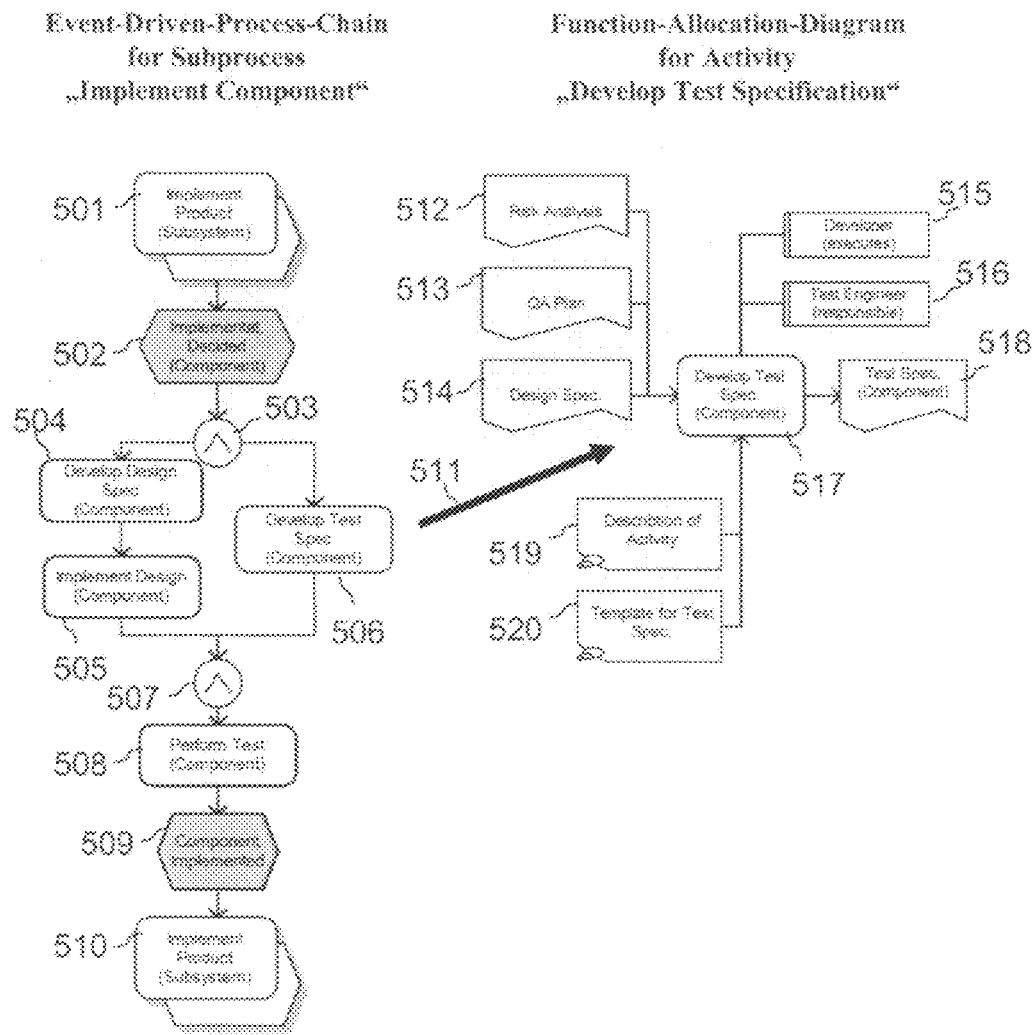
FIG. 5 shows an exemplary process model in EPC and FAD notation.

FIG. 5 shows an example of a process modeled as an EPC (Event-Driven Process Chain) and FAD (Function Allocation Diagram). Applying EPC and FAD in business process modeling is described for instance by R. Davis and R. Brabaender in "ARIS Design Platform—Getting Started with BPM", Springer, 2007. Further notations to describe business process models are e.g. Petri-Nets, Unified Modeling Language (UML).

In the exemplary sub-process "Implement Product (Subsystem)" of FIG. 5 the activity symbols 501 and 510 represent the starting point 501 and the end point 510 of the sub-process. The sub-process will be started when the state "Implementation decided (Component)" 502 in the sub-process "Implement Product (Subsystem)" is active. After getting to the state "Component Implemented" 509, work will continue in the sub-process "Implement Product (Subsystem)" as indicated in FIG. 5. These sub-processes can be executed many times within a project, even in parallel. The symbols 503 and 507 represent the starting 503 and the end point 507 of an AND split. The symbols 504, 505, 506, and 508 represent activities of the sub-process "Implement Product (Subsystem)".

For every activity, normally a "Function Allocation Diagram" (FAD) is defined, containing a description of the activity, the roles involved, input and output artifacts and links to further information like templates of artifacts. In FIG. 5 for the activity "Develop Test Spec (Component)" 506 an exemplary FAD is depicted on the right hand side of FIG. 5. The arrow 511 points from the EPC activity "Develop Test Spec (Component)" 506 to the corresponding FAD activity 517. The symbols 515 and 516 represent the involved roles (Developer and Test Engineer), the symbols 512, 513, 514, and 518 represent artifacts (Risk Analysis, QA Plan, Design Specification, Test Specification) which are required by or created in the activity. The symbol 519 represents the description of the activity, the symbol 520 represents a template for the Test Specification.

As mentioned before it is advantageous if a process model is available in XPDL (XML Process Definition Language). Having the reference process converted into XPDL the process can easily further processed automatically, because XPDL is a standard language and widely used. XPDL was defined by the Workflow Management Coalition (WfMC) and is a XML (extensible Markup Language) based standard for the exchange of workflow definitions. There is a wide range of tools available for processing XPDL (e.g. Enhydra JaWE (Java Workflow Editor)).

The following program listing is the XPDL code representation of the example of the sub-process depicted in FIG. 5 in EPC notation (the XPDL code does not include the representation of the Function-Allocation-Diagram of FIG. 5):

```
<?xml version="1.0" encoding="UTF-8" standalone="no"?>
<Package xmlns="http://www.wfmc.org/2002/XPDL1.0"
xmlns:xpdl="http://www.wfmc.org/2002/XPDL1.0"
xmlns:xsi="http://www.w3.org/2001/XMLSchema-instance" Id="root"
Name="Root" xsi:schemaLocation="http://www.wfmc.org/2002/XPDL1.0
```

```xml
http://wfmc.org/standards/docs/TC-1025_schema_10_xpdl.xsd">
  <PackageHeader>
    <XPDLVersion>1.0</XPDLVersion>
    <Vendor>ConvEX</Vendor>
    <Created>2007-01-05</Created>
  </PackageHeader>
  <Script Type="text/java"/>
  <Participants>
    <Participant Id="system_performer" Name="Systemnutzer">
      <ParticipantType Type="SYSTEM"/>
      <Description>The System is responsible for automatically eyecuting activities.</Description>
    </Participant>
  </Participants>
  <WorkflowProcesses>
    <WorkflowProcess AccessLevel="PUBLIC" Id="1" Name="Implement Component">
      <ProcessHeader>
        <Description>Implement Component</Description>
      </ProcessHeader>
      <Activities>
        <Activity Id="3" Name="Implement Design (Component)">
          <Implementation>
            <No/>
          </Implementation>
          <StartMode>
            <Manual/>
          </StartMode>
          <FinishMode>
            <Manual/>
          </FinishMode>
          <ExtendedAttributes>
            <ExtendedAttribute Name="formname" Value="tool_0"/>
          </ExtendedAttributes>
        </Activity>
        <Activity Id="2" Name="Develop Design Spec (Component)">
          <Implementation>
            <No/>
          </Implementation>
          <StartMode>
            <Manual/>
          </StartMode>
          <FinishMode>
            <Manual/>
          </FinishMode>
          <ExtendedAttributes>
            <ExtendedAttribute Name="formname" Value="tool_1"/>
          </ExtendedAttributes>
        </Activity>
        <Activity Id="1" Name="UND-Regel">
          <Route/>
          <StartMode>
            <Automatic/>
          </StartMode>
          <FinishMode>
            <Automatic/>
          </FinishMode>
          <TransitionRestrictions>
            <TransitionRestriction>
              <Split Type="AND">
                <TransitionRefs>
                  <TransitionRef Id="10"/>
                  <TransitionRef Id="11"/>
                </TransitionRefs>
              </Split>
            </TransitionRestriction>
          </TransitionRestrictions>
        </Activity>
        <Activity Id="5" Name="UND-Regel">
          <Route/>
          <StartMode>
            <Automatic/>
          </StartMode>
          <FinishMode>
            <Automatic/>
          </FinishMode>
          <TransitionRestrictions>
            <TransitionRestriction>
              <Join Type="AND"/>
            </TransitionRestriction>
          </TransitionRestrictions>
        </Activity>
        <Activity Id="4" Name="Develop Test Spec (Component)">
          <Implementation>
            <No/>
          </Implementation>
          <StartMode>
            <Manual/>
          </StartMode>
          <FinishMode>
            <Manual/>
          </FinishMode>
          <ExtendedAttributes>
            <ExtendedAttribute Name="formname" Value="tool_2"/>
          </ExtendedAttributes>
        </Activity>
        <Activity Id="8" Name="Perform Test (Component)">
          <Implementation>
            <No/>
          </Implementation>
          <StartMode>
            <Manual/>
          </StartMode>
          <FinishMode>
            <Manual/>
          </FinishMode>
          <ExtendedAttributes>
            <ExtendedAttribute Name="formname" Value="tool_3"/>
          </ExtendedAttributes>
        </Activity>
      </Activities>
      <Transitions>
        <Transition From="1" Id="10" To="2"/>
        <Transition From="5" Id="15" To="8"/>
        <Transition From="3" Id="13" To="5"/>
        <Transition From="4" Id="14" To="5"/>
        <Transition From="1" Id="11" To="4"/>
        <Transition From="2" Id="1_tra1" To="3"/>
        <Transition From=" " Id="1_tra2" To=" "/>
      </Transitions>
      <ExtendedAttributes>
        <ExtendedAttribute Name="formname" Value="forms_implement_component.xml"/>
      </ExtendedAttributes>
    </WorkflowProcess>
  </WorkflowProcesses>
</Package>
```

Figure 6:
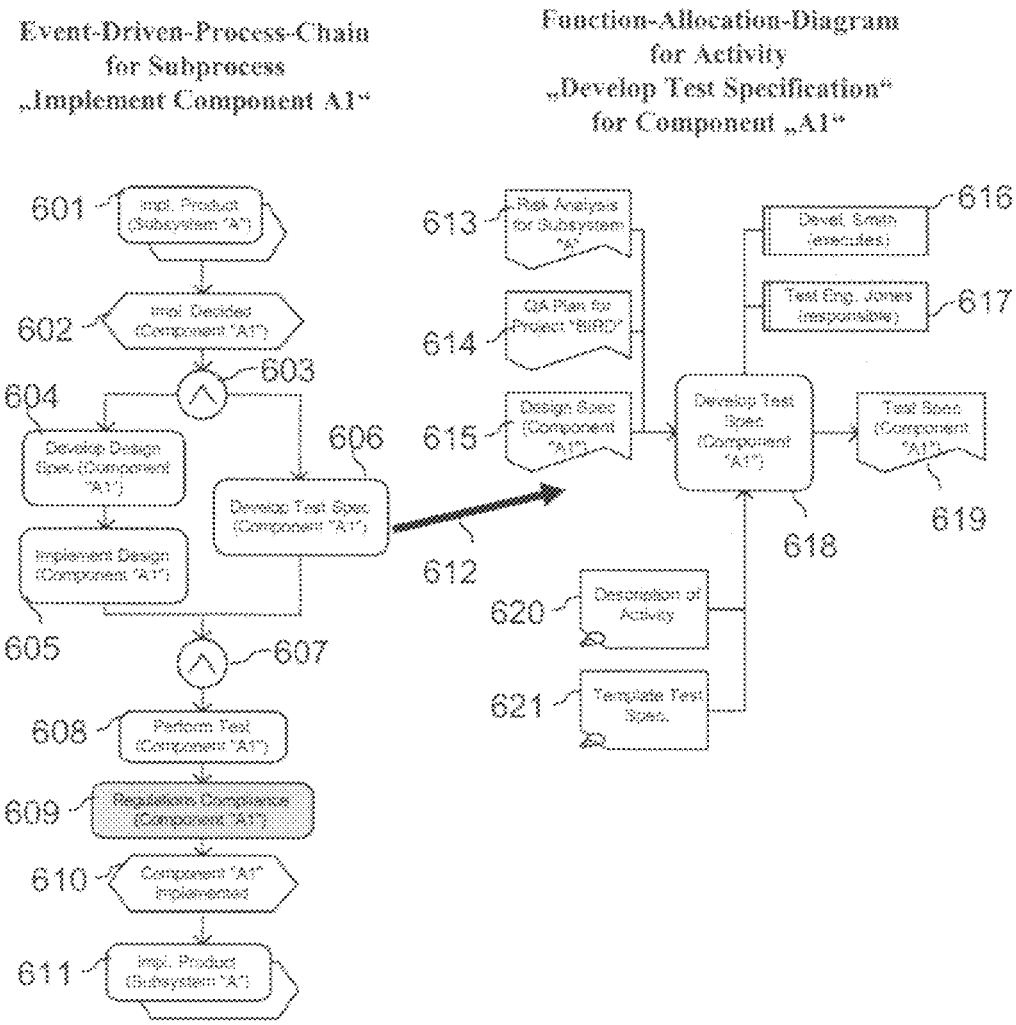
FIG. 6 shows the exemplary process model of FIG. 5 after performing an instantiation operation.

FIG. 6 shows the process model of FIG. 5 after its instantiation for the development of component "A1" of the subsystem "A" within a software development project ("BIRD"). The activity symbols 601 and 611 represent the starting point 601 and the end point 611 of the instantiated sub-process. An additional activity "Regulations Compliance" 609 was added during the step "Detailed instantiating the reference process" 24 (see FIG. 2) and the activities 604, 605, 606, 608, and 609 now contain component-specific information such as necessary project artifacts and assigned project members. The symbols 602 and 610 represent states of the subsystem "A". The instantiated process is described by means of EPCs containing all information necessary for an implementation of the instantiated process. For the instantiated activity "Develop Test Spec (Component "A1") 606 a Function-Allocation-Diagram (FAD) is exemplarily depicted on the right hand side of FIG. 6. The arrow 612 points from the EPC activity "Develop Test Spec (Component "A1")" 606 to the corresponding activity 618 in FAD notation. This FAD comprises effective project artifacts for the activity "Develop Test Specification for Component "A1" 606, e.g. Risk Analysis 613, QA Plan 614, Design Specification 615, and Test Specification

619. The symbol 620 represents the description of the activity "Develop Test Specification", the symbol 621 represents a template for the Test Specification. The symbols 616 and 617 represent effective assigned team members (respective actual resources) to the activity "Develop Test Specification".

Software and system development processes consist of a control flow dependent and a control flow independent part. Object and rules for their use are both described below. The objects start events, activities, milestones, gateways (splits and joins), milestones and end events can be used in this part of a software process. They are connected by transitions which form the control flow. A process has only one start event with only one transition leading to the second object of the process. A process has to have at least one end event which has only one incoming transition. Between start event and end events all remaining objects can occur by meeting the defined constraints. Splits and joins can be used to start and end parallel and alternative paths (control flow). The objects of the control flow are further detailed in the table below.

Artifacts are input and output of activities. An input is an artifact required or helpful for the execution of an activity. Artifacts can be created by activities or they can be static like documentation or templates. An output is an artifact created or changed by an activity. In the latter case, the artifact also has to be input of the activity. The input and output character is shown by the direction of the connection between the artifact and the activity.

In the following basic instantiation operations and use cases to apply them are described:

Inserting an Activity

An additional activity specified by the user is inserted in the control flow. The user provides the required information like where to insert the activity and what to do in the activity. The performer and artifacts required, created or updated by the activity are updated by the basic instantiation operations implementing this functionality e.g. "Associating an Artifact with an Activity".

| Object | Description |
| --- | --- |
| Start Event | A Start Event is the beginning of a process and has only one outgoing transition. There can be only one Start Event in a process. |
| Activity | An Activity has one incoming and one outgoing transition. There are manual and automatic activities. Manual activities are executed by humans and automatic activities are executed by an application. |
| Milestone | A Milestone is a special event. It has one incoming and one outgoing transition. |
| AND Split | An AND split has one incoming transition and at least two outgoing transitions. All outgoing transitions are executed as soon as the incoming transition is active. |
| AND Join | An AND join has at least two incoming and only one outgoing transition. The outgoing transition is executed when all incoming transitions are active. |
| XOR Split | An XOR split has one incoming transition and at least two outgoing transitions. Only one of the outgoing transitions is executed as soon as the incoming transition is active. The decision which transition to follow is made by a performer of the preceding object of the XOR split which therefore has to be an activity. |
| XOR Join | An XOR split has at least two incoming but only one outgoing transition. Only one of the incoming transitions can be active. As soon as one incoming transition is active the outgoing transition is activated. |
| OR Split | An OR split has one incoming transition and at least two outgoing transitions. At least one of the outgoing transitions is/are executed as soon as the incoming transition is active. The decision which transition(s) to follow is made by the performer of the preceding object of the OR split which therefore has to be an activity. |
| OR Join | An OR split has at least two incoming but only one outgoing transition. The OR split waits for the number of incoming transitions to be active which were chosen by an earlier OR split. As soon as these transitions are active the join activates the outgoing transition. |
| End Event | An End Event is the end of a process and has only one incoming transition. There can be several End Events in a process. |

The control flow independent part of a process consists of objects which are not part of the control flow (i.e. participants and artifacts).

Participants can be either human or a system. Human participants can be of the type person, role, organizational unit, group and non-human participants can be of the type system. Participants can only be assigned to activities. Human participants are associated to manual activities and can have the relationship "executes", "responsible for", "accepts", "contributes" and "has to be informed". A manual activity has to have at least one participant with the relationship "executes" and not more than one with the relationship "responsible for". Only one application can be assigned to an automatic activity with the relationship "executes". An additional human participant has to be associated with an automatic activity with the relationship "is responsible for".

Use Case for Inserting an Activity:

The development of system X requires an additional activity "Check Adherence of Compliance Regulations" which is not part of the reference process. The instantiation system inserts the activity in the spot specified by the user. Because the user wants to insert the activity in front of an XOR split, the system moves the responsibility of making the decision which way to follow from the preceding activity to the inserted activity.

Deleting an Activity

An activity of the process selected by the user is deleted from the process. The operation also includes the deletion of gateways, artifacts and participants because they are automatically erased when not needed any more due to the deletion of activities.

Use Case for Deleting an Activity:

The activity "Check safety criticality" of the reference process is not needed when applying the process in the project at hand. The activity's preceding object is an AND split and the successive object is a AND join. Both constructs become obsolete when deleting the activity. The activity to be deleted does not create any artifacts, but updates the "requirements specification". The user is informed about this fact and decides that the parts updated by the activity are not relevant for any other activities. The activity is deleted by the instantiation system without moving the task of updating the artifact to another activity. Beside the activity, the AND splits and join are deleted too.

Inserting an Alternative/Parallel Path

An additional parallel or alternative path is inserted into the process. The new path can be a dead end or can join the main path again. Adding additional objects to the new path like activities or milestones is handled by the operation "Inserting an Activity" and "Inserting a Milestone".

Use Case for Inserting an Alternative/Parallel Path:

The development of system X might allow the application for a patent. Whether this is possible can be analyzed when the milestone "M100" is reached but does not affect the following activities and can therefore be done in parallel. The user of the instantiation system specifies where the additional path diverges from the main path by means of an AND split and where the path joins the main path again. After creating the additional path, the activity "Analyze Patent Situation" can be inserted by using the basic operation "Inserting an Activity".

Selecting/Deleting a Path

An optional path (i.e. a path leading from an XOR/OR split) specified by the user is deleted. The path and all objects on it are deleted until it joins the main path again or the path ends.

Use Case Selecting/Deleting a Path:

Two paths lead from an XOR split. Which path to follow depends on the decision in the activity "Check Necessity of User Study" preceding the XOR split. It is decided that no user study is necessary. Therefore the path leading to the activities implementing the user study and all objects on it are deleted by the instantiation system until it joins the executed path again.

Duplicating a Sub Process

Sub processes which can be duplicated are marked. The operation "Duplicating a Sub Process" creates a copy of a marked sub process. Beside the objects of the control flow (activities, gateways, etc.) also process artifacts, files implementing the artifacts and resources are duplicated and renamed. The duplicated path is connected with the existing path with a AND split and is joined with the main process (if required) with an additional AND join.

Use Case for Duplicating a Sub Process:

The system to be developed is split up into the development of three sub systems. The general description for the development of sub systems in the reference process is copied three times by the instantiation system. Every one of the copied sub processes are instantiated including renaming, the assignment of new identifiers to the objects in the duplicated sub process (activities, gateways, artifacts, participants) and the files implementing the artifacts.

Associating an Artifact with an Activity

An existing artifact of the process is added as input and/or output artifact of an activity.

Use Case for Associating an Artifact with an Activity

The artifact "invention disclosure" is required for the development of the design specification of a component X. Therefore the artifact is associated as input of the activity "Develop Design Specification" of the component X by the instantiation system according to the information provided by the user. The system can execute the operation because the artifact is created by the activity "write invention disclosure" which is located before the development of the design specification.

Deleting an Association of an Artifact with an Activity

A process artifact is deleted from an activity. Consequences of the deletion have to be managed because the artifact can be used by other activities. The file implementing the artifact is deleted too when not used by any other activity.

Use Case for Deleting an Association of an Artifact with an Activity:

The artifact "Make or Buy" which contains the reasoning about whether to develop a system or to buy it is required by the activity "Write Functional Specification". However, this input is not required for the activity "Write Functional Specification" of the development of sub system X The association of the artifact as input of the activity is deleted by the instantiation system according to the information specified by the user.

Adding an Artifact to the Process

A new process artifact is added to the process. The user has to provide all information required for the artifact specification in the process. Beside the process artifact also the file implementing the artifact is created and associated with the process artifact. The associations of the artifact with activities are created by the operation "Associating an Artifact with an Activity".

Use Case for Adding an Artifact to the Process:

The customer of the project at hand has already developed test cases which have to be integrated in the test specification of the development of component X of the system to be developed. The artifact is added to the process by the instantiation system and the file implementing the artifact is added to the project directory. A link to the location of the file is inserted in the description of the artifact in the process. The association of the artifact as input in the activity "Develop test specification" for component X is created by the operation "Associating an Artifact with an Activity".

Removing an Artifact from the Process

The artifact is not only deleted from a single activity but from the entire process (the process artifact itself and all associations with activities). Beside the artifact in the process also the file implementing the artifact is deleted.

Use Case for Removing an Artifact from the Process:

The artifact "Make or Buy" is not needed in the project at hand because the management decided not to buy any components. The artifact and all its associations in the process are deleted by the instantiation system as well as the file implementing the artifact in the project directory.

Associating an Artifact with a File Implementing the Artifact

A template or an already existing implementation of an artifact is instantiated by copying it to the project directory and renaming it. A link to the location of the file is inserted in the documentation of the artifact in the process.

Use Case for Associating an Artifact with a File Implementing the Artifact:

The artifact "Project Management Plan" is instantiated. The corresponding template is copied to the project directory by the instantiation system and its name is extended by the project name. A link to the location of the file is added to the description of the artifact "Project Management Plan" in the process.

Associating a Participant with an Activity

A participant is associated with an activity. Care has to be taken because there are restrictions on the relationship a performer can have with an activity e.g. there can only be one participant "responsible for" the execution of an activity.

Use Case for Associating a Participant with an Activity:

The project manager decides that developer Miller has to join the team for implementing the component X of the system to be developed. The instantiation system associates Miller with the activity "Implement Component X" with the relationship "executes.

Deleting an Association of a Participant with an Activity

The association of a participant with an activity is deleted. Care has to be taken because of the different relationships a performer can have with an activity.

Use Case I for Deleting an Association of a Participant with an Activity:

Developer Smith executes together with other developers the activity "Implement Design Specification" of component X. The management decides that he is not needed and therefore the association has to be deleted. The system deletes the association because Smith was not the only participant with the relationship "executes" with the activity. (An activity always has to have at least one participant associated with the relationship "executes").

Use Case II for Deleting an Association of a Participant with an Activity:

The role "Architect" is associated with the activity "Get Decision Milestone 30" with the relationship "contributes" in the reference process. However, this contribution is not required for the project at hand and therefore has to be deleted. The system deletes the association on the basis of user input.

Adding a Participant to the Process

An additional participant (abstract or real person) is added to the process. The user has to specify all necessary information. Associations are established by the operation "Associating a Participant with an Activity".

Use Case for Adding a Participant to the Process:

The Management decides that an additional role "Author of Manual" is required. The instantiation system creates the role according to the information specified by the user.

Removing a Participant from the Process

A participant of the process and all its associations with activities are deleted. Care has to be taken because of the different relationships a performer can have with an activity.

Use Case for Removing a Participant from the Process:

The role "External Partner" is not required in the project at hand. The role and all associations are deleted from the process for the project by the instantiation system because the role has no required relationships like "executes" or "responsible for" with any activity.

Inserting a Milestone

A new milestone is inserted in the process.

Use Case for Inserting a Milestone:

Management decides to insert an additional milestone in the process. The instantiation system creates a new milestone and inserts it in the control flow of the process according to the information and spot specified by the user.

Deleting a Milestone

A milestone is deleted from the process.

Use Case for Deleting a Milestone:

Management decides that Milestone 50 is not needed any more. The instantiation system deletes the milestone and connects the object preceding the milestone with the successive object.

Assignment of a Real World Participant to an Abstract Participant of an Activity A role defined as participant in an activity is replaced by an actual person: This operation can be implemented by the operations "Associating a (real world) Participant with an Activity" and "Deleting an Association of an (abstract) Participant from an Activity". An additional basic instantiation operation is not required.

Deleting a Gateway

This instantiation operation is not required because obsolete gateways are deleted when deleting an activity or milestone.

Below, exemplary dependencies are described which have to be considered when deleting activities from a software or system development reference process described as a workflow model. Dependencies of this basic instantiation operation can be distinguished between control flow related and control flow independent.

Control Flow Dependent Consideration

Below possible workflow patterns are described emerging when deleting activities. The activity to be deleted is shown with its preceding and succeeding object.

In the following table process patterns are defined which can emerge in the control flow when deleting an activity from a software or system development process. For every pattern it is detailed whether the activity can be deleted, what consequences arise and how they can be overcome. Each pattern consists of three objects. The object in the middle is the activity to be deleted.

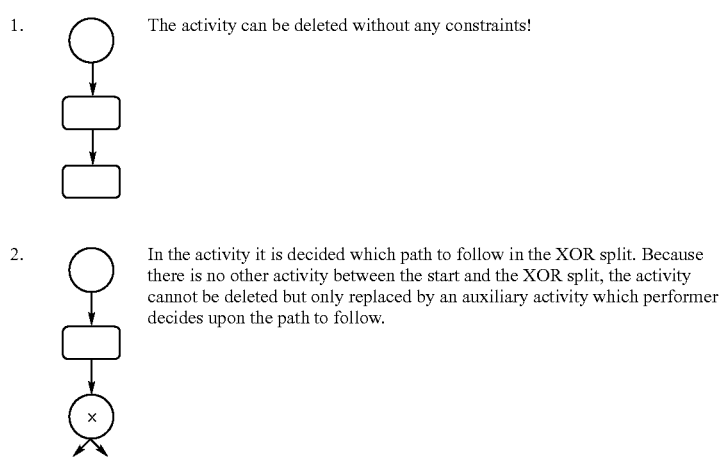

1. The activity can be deleted without any constraints!

2. In the activity it is decided which path to follow in the XOR split. Because there is no other activity between the start and the XOR split, the activity cannot be deleted but only replaced by an auxiliary activity which performer decides upon the path to follow.

-continued

| | | |
|---|---|---|
| 3. | 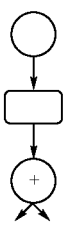 | A decision upon which path to follow in the AND split has not to be made because all paths leading from the split will be activated. The activity can be deleted without constraints. The start event is followed by the AND split. |
| 4. | 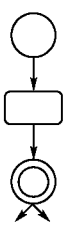 | In the activity it is decided which path to follow in the OR split. Because there is no other activity between the start and the OR split, the activity cannot be deleted but only replaced by an auxiliary activity which performer decides upon the path to follow. |
| 5. |  | This scenario is not possible because several start events within one process are not allowed. |
| 6. |  | This scenario is not possible because several start events within one workflow are not allowed. |
| 7. | 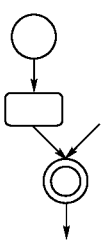 | This scenario is not possible because several start events within one workflow are not allowed. |
| 8. | 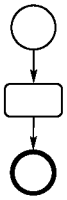 | The activity can be deleted without constraints. |
| 9. | 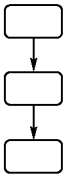 | The activity can be deleted without any constraints. |

-continued

| | | |
|---|---|---|
| 10. | | The person executing the activity has to make the decision which path to follow after the XOR Split. The activity can be deleted, but decision making has to be moved to the activity preceding the activity to be deleted. |
| 11. | | The execution of an AND split does not require human decision. Therefore the activity can be deleted without constraints. |
| 12. | | The person executing the activity has to make the decision which path to follow after the OR Split. The activity can be deleted, but decision making has to be moved to the activity preceding the activity to be deleted. |
| 13. | | XOR joins do not require any input by the performer of the activity to be deleted. Activity can be deleted without constraints. |
| 14. | | AND joins do not require any input by the performer of the activity to be deleted. Activity can be deleted without constraints. |
| 15. | | OR joins do not require any input by the performer of the activity to be deleted. Activity can be deleted without constraints. |
| 16. | | The activity can be deleted without constraints. |

-continued

| | | |
|---|---|---|
| 17. | 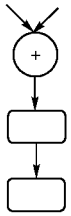 | The activity can be deleted without constraints. |
| 18. | 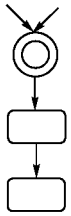 | The activity can be deleted without constraints. |
| 19. | 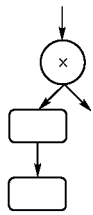 | The activity can be deleted without constraints. |
| 20. | 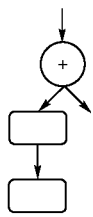 | The activity can be deleted without constraints. |
| 21. | 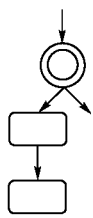 | The activity can be deleted without constraints. |
| 22. | 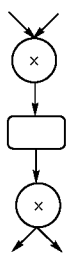 | In the activity it is decided which way to follow in the XOR split. When the activity is deleted decision making has to be moved to another activity (predecessor). Because the predecessor is a XOR join decision has to be made in the preceding activities of the XOR join. This is possible because only one of the paths leading to the XOR join is going to be active and only one activity will be involved. The activity can be deleted; XOR Join is followed by XOR Split. Join and Split cannot be merged. |

| | | |
|---|---|---|
| 23. | | AND splits do not require human interaction. The activity can be deleted; XOR Join is followed by AND split. Join and Split cannot be merged. |
| 24. | | In the activity it is decided which way/ways to follow in the OR split. When the activity is deleted decision making has to be moved to another activity (predecessor). Because the predecessor is a XOR join, the decision has to be made by preceding activities of the XOR join. This is possible because only one of the paths leading to the XOR join is going to be active (only one activity is involved). The activity can be deleted; XOR Join is followed by OR Split. Join and split cannot be merged. |
| 25. | | In the activity it is decided which way to follow in the XOR split. When the activity is deleted, decision making has to be done in a preceding activity. Because the predecessor is an AND join all activities on the paths leading to the AND join will be executed. Consensus has to be found which way to follow. Pushing the decision making into the predecessors of the AND join is not reasonable, because it cannot be guaranteed that the decision is made on the basis of all information available (which will be the case after the AND Join). The activity cannot be deleted, but replaced by an auxiliary activity which decides upon the way to follow. |
| 26. | | AND splits do not require routing by the preceding activity. The activity can be deleted without constraints. The AND join cannot be deleted, because paths would not be synchronized any more. AND join is followed by the AND split. Merging of the joins is not possible. |
| 27. | | In the activity it is decided which way to follow in the OR split. When Activity is deleted, decision making has to be moved to a preceding activity. Because predecessor is AND join all predecessor activities of the AND join will be executed. Consensus has to be found which way to follow. Pushing the decision making into the predecessors of the AND join is not reasonable, because it cannot be guaranteed that the decision is made on the basis of all information available (which will be the case after the AND Join). The activity cannot be deleted, but replaced by an auxiliary activity which decides upon the way to follow. |
| 28. | | In the activity it is decided which way to follow in XOR split. When the activity is deleted this has to be done in another activity (predecessor). Because all paths leading to the OR join can be active consensus has to be found in making the decision which way to follow in the XOR split by bearing in mind all information (from all paths leading to the OR join). The activity cannot be deleted but replaced by an auxiliary activity which decides upon the way to follow. |

-continued

29. 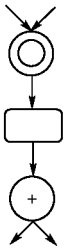 AND splits do not require any routing. The activity can be deleted. Merging the join with the split is not possible. OR join is followed by AND split.

30. 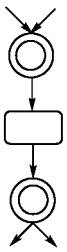 In the activity it is decided which way to follow in the OR split. When the activity is supposed to be deleted this has to be done in another activity (predecessor). Because all paths leading to the OR join can be active consensus has to be found in making the decision which way to follow in the OR split by bearing in mind all information (from all paths leading to the OR join). The activity cannot be deleted but replaced by an auxiliary activity which decides upon the way to follow.

31. 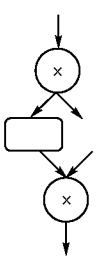 The activity can be deleted. If only two paths lead from the XOR split, the split can be deleted too. If only two paths lead to the join, the join can be deleted too. Two paths leading from the split does not imply two paths leading to the join.

32.  This construct is not correct and will lead to a deadlock!

33.  The activity can be deleted. If only two paths lead from the XOR split, the split can be deleted too. If only two paths lead to the join, the join can be deleted too. Two paths leading from the split does not imply two paths leading to the join.

34. 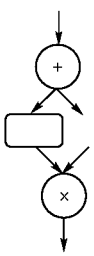 The activity can be deleted. If only two paths lead from the AND split, the split can be deleted too. If only two paths lead to the join, the join can be deleted too. Two paths leading from the split does not imply two paths leading to the join.

| | | |
|---|---|---|
| 35. | 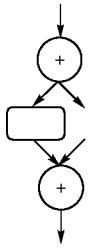 | The activity can be deleted. If the path is only split up into two branches the AND split can be deleted too. If only two branches lead to the AND join, the AND join can be deleted, too. (Two branches leading from the AND split do not imply only two paths leading to the AND join) |
| 36. | 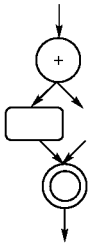 | The activity can be deleted. If the path is only split up into two branches the AND split can be deleted too. If only two branches lead to the OR join, the OR join can be deleted. (Two branches leading from the split do not imply only two paths leading to the join) |
| 37. | 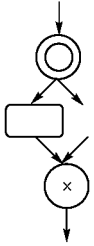 | The activity can be deleted. If the path is only split up into two branches the OR split can be deleted too. If only two branches lead to the XOR join, the AND join can be deleted, too. (Two branches leading from the OR split do not imply only two paths leading to the XOR join) |
| 38. |  | This construct is not correct because not all paths from the OR split have to be followed but all paths leading to the AND join have to be active to allow synchronizations and further process. This construct can lead to a dead lock. |
| 39. | 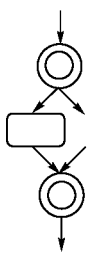 | The activity can be deleted. If the path is only split up into two branches the OR split can be deleted. If only two branches lead to the OR join. The OR join can be deleted. (Only two branches leading from the OR split do not imply only two paths leading to the OR join) |
| 40. | 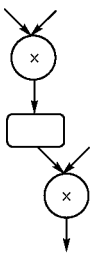 | XOR joins do not require routing by an activity. The activity can be deleted. The two XOR joins can be merged to one because only one of the incoming paths (of both joins) can be active. |

-continued

| | | |
|---|---|---|
| 41. | 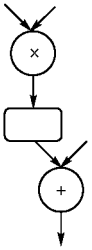 | Neither XOR join nor AND join require routing by an activity. The activity can be deleted. The joins could be merged to an OR join, but it is not recommended because of loss of clarity. |
| 42. | 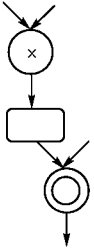 | Both joins do not require routing by the activity. The activity can be deleted. The joins could be merged to an OR join, but it is not recommended because of loss of clarity (Information that only one of the two paths leading to the XOR join can be active is not explicitly given any more.) |
| 43. | 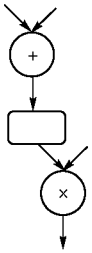 | Both joins do not require routing by the activity. The activity can be deleted. The joins could be merged to an OR join, but it is not recommended because of loss of clarity. |
| 44. | 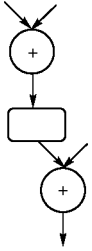 | Both joins do not require routing by the activity. The activity can be deleted. Both joins can be merged to one AND join. |
| 45. | 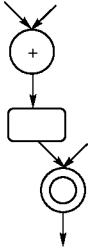 | Both joins do not require routing by the activity. The activity can be deleted. The joins could be merged to an OR join, but it is not recommended because of loss of clarity |
| 46. | 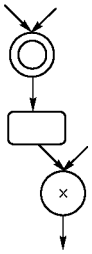 | Both joins do not require routing by the activity. The activity can be deleted. The joins could be merged to an OR join, but it is not recommended because of loss of clarity |

-continued

| | | |
|---|---|---|
| 47. | 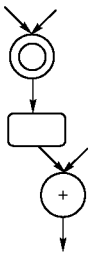 | Both joins do not require routing by the activity. The activity can be deleted. The joins could be merged to an OR join, but it is not recommended because of loss of clarity |
| 48. | 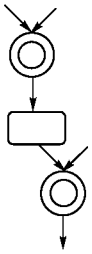 | Both joins do not require routing by the activity. The activity can be deleted. Joins can be merged. |
| 49. | 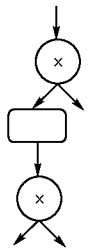 | Both splits require routing by the predecessor activities. When deleting the activity decision making has to be moved to the next activity to the top of the process. The activity can be deleted. The two XOR splits can be merged to one XOR split. |
| 50. | 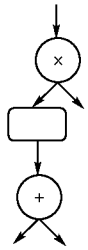 | The AND split does not require routing by the activity. The activity can be deleted. The AND split could be merged with the XOR split by an OR split, but it is not recommended due to loss of clarity. Furthermore in the current layout only decision for the paths leading from the XOR split has to be made. After merging to an OR split also decision for the paths leading from the AND split are required. |
| 51. | 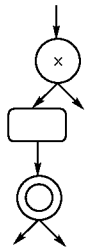 | The OR split requires routing by the activity. The activity can be deleted. The decision has to be made in the next activity further to the top. The splits could be merged to an OR split but it is not recommended due to loss of clarity. |
| 52. | 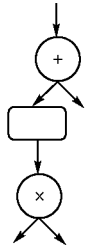 | The XOR split requires routing by the activity. The activity can be deleted. The decision has to be made in the activity preceding the AND split. Both splits could be merged by an OR split, but it is not recommended due to loss of clarity. Furthermore in the current layout only a decision for the paths leading from the XOR split has to be made. After merging to an OR split also decision for the paths leading from the AND split are required. |

-continued

| | | |
|---|---|---|
| 53. | 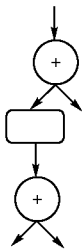 | No routing by the activity is required. The activity can be deleted. Both joins can be merged. |
| 54. | 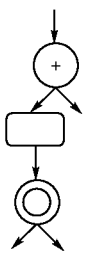 | The OR split requires routing by the activity. The activity can be deleted. The decision has to be made in the activity preceding the AND split. Both splits could be merged by an OR split, but it is not recommended due to loss of clarity. Furthermore in the current layout only decision for the paths leading from the OR split has to be made. After merging to an OR split also decision for the paths leading from the AND split are required. |
| 55. | 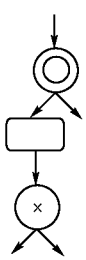 | The XOR split requires routing by the activity. The activity can be deleted. The decision has to be made in the activity preceding the OR split. The splits could be merged to an OR split, but it is not recommended due to loss of clarity. |
| 56. | 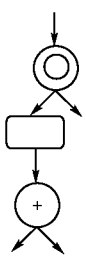 | No routing by the activity is required. It can be deleted. Merging the joins is possible, but implies loss of clarity. Furthermore in the current layout only decision for the paths leading from the OR split has to be made. After merging to an OR split also decision for the paths leading from the AND split are required. |
| 57. | 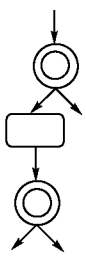 | The OR split requires routing by the activity. Decision is made in the activity preceding the first OR split. The activity can be deleted. Splits can be merged. |
| 58. | 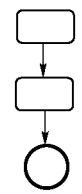 | The activity can be deleted without any constraints. |

| | | |
|---|---|---|
| 59. | 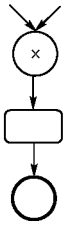 | The activity can be deleted. The XOR join can be deleted when adding End Events to the paths leading to the XOR join. |
| 60. | 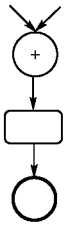 | The activity can be deleted. The AND join can be deleted when adding End Events to the paths leading to the AND join. |
| 61. | 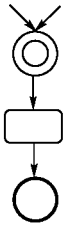 | The activity can be deleted. The OR join can be deleted when adding End Events to the paths leading to the OR join. |
| 62. |  | The activity and end event can be deleted. If only two paths lead from the XOR split, the XOR split can be deleted too and only the path leading down the second branch remains. |
| 63. |  | The activity and end event can be deleted. If only two paths lead from the AND split, the AND split can be deleted too and only the path leading down the second branch remains. |
| 64. |  | The activity and end event can be deleted. If only two paths lead from the OR split, the OR split can be deleted too and only the path leading down the second branch remains. |

Control Flow Independent Consideration

Beside consequences in the control flow, now it is analyzed what has to be considered in the control flow independent part of the software or system development process when deleting an activity.

1) Artifact Associated with the Activity a) Artifact is only input to the activity to be deleted:
The association between activity and artifact has to be deleted. No further actions have to be undertaken.

b) Artifact is only output of the activity to be deleted:
It has to be checked whether the artifact is associated with any other activity.
If no: The association and the artifact itself can be deleted.
If yes: Either the activity cannot be deleted or another activity which has not been executed yet but will be executed before the activity/ies requiring the artifact has to create the artifact.

c) Artifact is input and output
The artifact is associated with other activities (is created by another activity).
If the activity to be deleted updates the artifact and other activities on the path between the activity to be deleted and an end event is associated with the artifact:
The user has to decide whether the activity to be deleted updates a part of the artifact which is required by another activity.
If no: The association with the activity can be deleted.
If yes: Either the activity cannot be deleted or another activity which has not been executed yet but will be executed before the activity/ies requiring the part of the artifact has to update the artifact.

2) Performer of an Activity

The associations connecting participants with the activity can be deleted.

If the performer is not associated with any other activity, the performer itself can be deleted.

Figure 7:
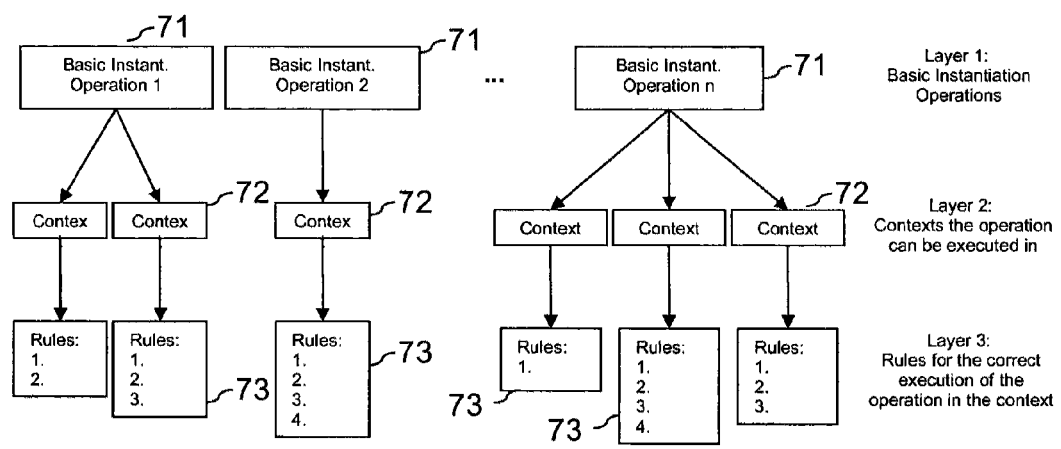
FIG. 7 shows a schematic diagram of the interrelation between basic instantiation operations, contexts and rules restricting the execution of an instantiation operation in a particular context.

FIG. 7 shows a schematic diagram of the interrelation between basic instantiation operations 71, contexts and rules restricting the execution of an instantiation operation 71 in a particular context 72. The settings an operation can be nested in are used for the definition of contexts 72 an operation is allowed to be executed in. For every context 72, rules 73 are defined restricting the execution of a basic instantiation operation 71 in a particular context 72. The rules 73 guarantee a syntactically correct and consistent resulting process.

The example depicted in FIG. 5 is used as a further exemplary use case to demonstrate the application of the inventive approach and to clarify the notion of contexts and rules. The following scenario is used as an exemplary use case:

Project management decides that no test specification is required because the specification is provided by a third party. The activity "Develop Test Specification" has to be deleted.

Identification of Context: The activity to be deleted in FIG. 5 is preceded by an AND split and followed by an AND join.

For deleting an activity in this context the rules below have to be followed. However, the rules described in this example are simplified. For instance, they do not contain any management of errors or exceptions like they have to be managed in reality.

1. Run the basic instantiation "Deleting an Association of an Artifact with an Activity" for all associations.
2. Run the basic instantiation operation "Deleting an Association of a Participant with an Activity" for all associations starting with participants having not the relationship "executes" (since there always has to be one executing participant whose association with the activity therefore has to be deleted last).
3. Delete Activity
4. If only two paths lead from the preceding split, delete the split and connect the split's preceding object with the split's successive object not to be deleted.
5. If only two paths lead to the successive join, delete the join and connect the join's successive object with its preceding object not to be deleted.

Figure 8:
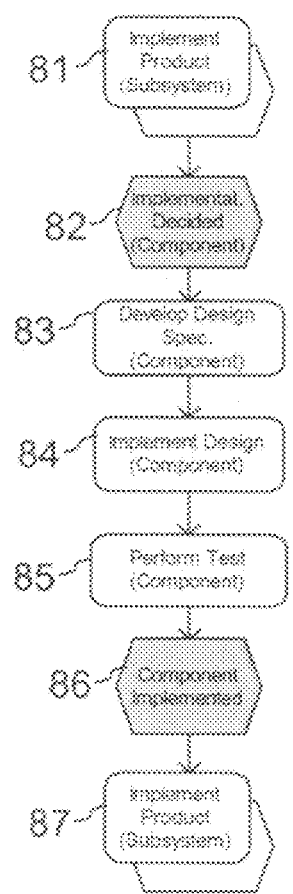
FIG. 8 shows the resulting process after applying the instantiation operation "Deleting an Activity" to the example of FIG. 5.

FIG. 8 shows the resulting instantiated EPC of the example process of FIG. 5 after adapting the process as described in the use case above. In FIG. 8 the activity symbols 81 and 87 represent the starting point 81 and the end point 87 of the instantiated sub-process. The symbols 82 and 86 represent states of the exemplary subsystem. The symbols 83, 84, and 85 represent the activities of the exemplary sub-process after the instantiation operation.

Figure 9:
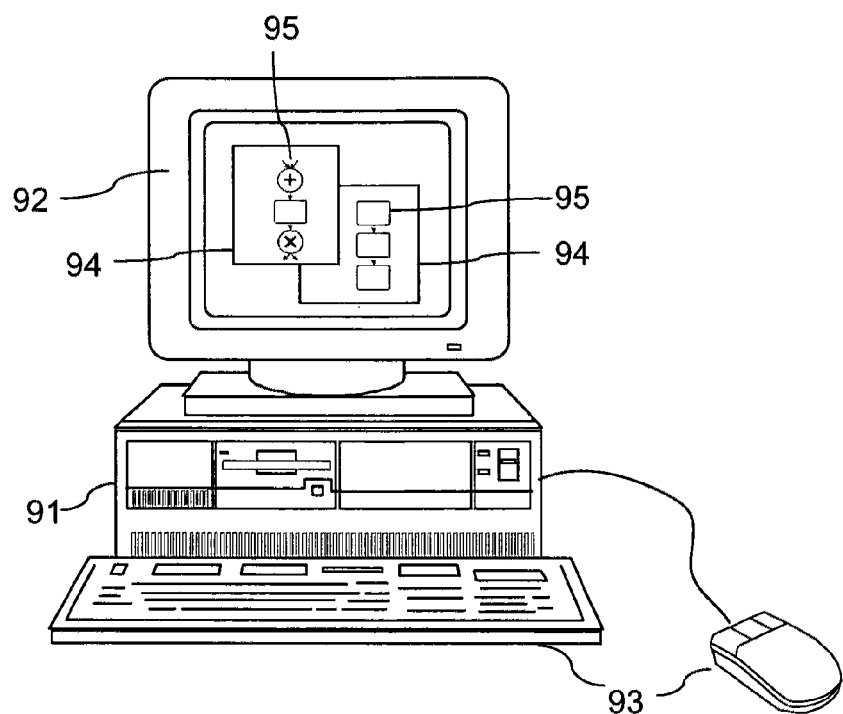
FIG. 9 shows an example of a computer system to perform the inventive method with tool support.

FIG. 9 shows an example of a computer system to perform the inventive method for rule based instantiation of a generic software and/or system development process to provide a project specific instantiated process, the system comprising input mechanisms 93 (keyboard, mouse, touch-pen etc.) to select, create or modify reference processes describing a workflow for software and/or system development, wherein the workflow is described by a modeling language. The modeling language can also be modified and triggered to be processed by the input mechanisms 93. Furthermore with the input mechanisms 93 the instantiation operations including the applicable rules can be selected, modified or triggered to be processed. On a screen, display or monitor 92 the user can view the reference process, the XPDL representation of the reference process, results after applying instantiation steps, and the project specific instantiated implemented process. On the screen 92 windows 94 can be used to arrange and display the processes, workflows 95, code representations or parts of them. The system also comprises a central processing unit (CPU) 91 adapted for automatically performing the instantiation operations for high-level and detailed instantiating. Furthermore the system comprises a memory unit for storing the reference processes, the project specific instantiated implemented process, the program code for performing the instantiation operations and applying the rules, the necessary converters (e.g. for converting the reference process into XPDL). The system ensures that decisions and interpretations made during creation and modification of the reference process or plans by project members are documented and reproducible. Tool support by generating a project specific instantiated development process increases the efficiency of the project members, because project specific adaptations are easily to achieve and the respective project specific documentation is automatically provided and consistent. Manual adaptations would be time consuming, prone to errors, and expensive.

Having described and illustrated the principles of the invention in a preferred embodiment thereof, it should be apparent that the invention can be modified in arrangement and detail without departing from such principles. We claim all modifications and variations coming within the spirit and scope of the following claims.

What claimed is:

1. A method for rule based instantiation of a generic software and/or system development process to provide a project specific instantiated process, the method comprising:
providing a reference process describing a workflow for software and/or system development, wherein the workflow is described by a modeling language describing the reference process with objects, comprising a control flow dependent part having control flow objects and a control flow independent part with independent objects that are not part of the control flow;

high-level instantiating the reference process by applying basic instantiation operations and use cases to the objects according to predefined rules which consider contexts comprising dependencies between the objects to determine constraints to the applied instantiation operation for both control flow objects and independent objects, wherein the high-level instantiating is based on project characteristics which do not change frequently;

detailed instantiating the reference process by applying basic instantiation operations and use cases to the objects according to predefined rules which consider contexts comprising dependencies between the objects to determine constraints to the applied instantiation operation for both control flow objects and independent objects, wherein the detailed instantiating comprises adapting the process on short-term process needs; and providing a project specific instantiated process based on high-level instantiating and detailed instantiating the reference process, wherein the method steps of high-level instantiating and detailed instantiating are based on the same basic instantiation operations.

2. The method according to claim 1, further comprising:
converting the reference process to the XML Process Definition Language (XPDL).

3. The method according to claim 1, wherein the reference process is described by Event-Driven-process-Chains (EPC) and/or Function-Allocation-Diagrams (FAD).

4. The method according to claim 1, wherein each of the steps high-level instantiating, detailed instantiating, and providing a project specific process can be performed iteratively.

5. The method according to claim 1, wherein the step high-level instantiating is performed only at the beginning of a project or when major project characteristics change.

6. The method according to claim 1, wherein the step high-level instantiating is performed as a batch by executing several instantiation operations.

7. The method according to claim 1, wherein the project characteristics in step high-level instantiating comprising:
small project;
medium project;
large project;
inhouse project;
outfarm project;
offshore project;
high reliability; and
type of development process.

8. The method according to claim 1, wherein in the step detailed instantiating the instantiation operations are executed individually.

9. The method according to claim 1, wherein the step detailed instantiating comprises the assignment of persons, timeframes, and due dates to process activities.

10. The method according claim 1, wherein the instantiation operations comprising:
inserting an activity;
deleting an activity;
inserting an alternative/parallel path;
selecting/deleting a path;
duplicating a sub-process;
associating an artifact with an activity;
deleting an association of an artifact with an activity;
adding an artifact to the process;
removing an artifact from the process;
associating an artifact with a file implementing the artifact;
associating a participant with an activity;
deleting an association of a participant with an activity;
adding a participant to the process;
removing a participant from the process;
inserting a milestone; and
deleting a milestone.

11. The method according to claim 1, wherein the instantiation operations for the step high-level instantiating are an aggregation of the instantiation operations for the step detailed instantiating.

12. The method according to claim 1, wherein in the step detailed instantiating the instantiation operations are performed frequently.

13. The method according to claim 1, wherein the project specific instantiated process is implemented as process visualization and/or project plan and/or work flow support and/or management of project artifacts.

14. The method according to claim 1, wherein performing of instantiation operations is documented and/or checked for consistency by quality assurance mechanisms.

15. The method according to claim 1, wherein performing of instantiation operations is supported by tools.

16. A computer-implemented system for performing by a processor a method for rule based instantiation of a generic software and/or system development process to provide a project specific instantiated process, the system comprising:
a mechanism for providing a reference process describing a workflow for software and/or system development, wherein the workflow is described by a modeling language describing the reference process with objects, comprising a control flow dependent part having control flow objects and a control flow independent part with independent objects that are not part of the control flow;
a mechanism for high-level instantiating the reference process by applying basic instantiation operations and use cases to the objects according to predefined rules which consider contexts comprising dependencies between the objects to determine constraints to the applied instantiation operation for both control flow objects and independent objects, wherein the high-level instantiating is based on project characteristics which do not change frequently;
a mechanism for detailed instantiating the reference process by applying basic instantiation operations and use cases to the objects according to predefined rules which consider contexts comprising dependencies between the objects to determine constraints to the applied instantiation operation for both control flow objects and independent objects, wherein the detailed instantiating comprises a short-term aligning of the process on alterable process requirements; and
a mechanism for providing a project specific instantiated process based on high-level instantiating and detailed instantiating the reference process, wherein
the instantiation operations for high-level instantiating are an aggregation of the instantiation operations for detailed instantiating and wherein high-level instantiating and detailed instantiating are based on the same instantiation operations.

17. A non-transitory computer readable medium, having a program recorded thereon, wherein the program when executed by a processor causes a computer to perform the method steps:
providing a reference process describing a workflow for software and/or system development, wherein the workflow is described by a modeling language describing the reference process with objects, comprising a control flow dependent part having control flow objects and a control flow independent part with independent objects that are not part of the control flow;

high-level instantiating the reference process by applying basic instantiation operations and use cases to the objects according to predefined rules which consider contexts comprising dependencies between the objects to determine constraints to the applied instantiation operation for both control flow objects and independent objects, wherein the high-level instantiating is based on project characteristics which do not change frequently;

detailed instantiating the reference process by applying basic instantiation operations and use cases to the objects according to predefined rules which consider contexts comprising dependencies between the objects to determine constraints to the applied instantiation operation for both control flow objects and independent objects, wherein the detailed instantiating comprises instantly adapting the process on short-term process requirements; and providing a project specific instantiated process based on high-level instantiating and detailed instantiating the reference process, wherein the method steps of high-level instantiating and detailed instantiating are based on the same basic instantiation operations.

18. The method of claim 1, wherein the contexts considered are identified by workflow patterns around the object to which the basic instantiation operations are being applied, the workflow patterns comprising the object to which the basic instantiation operations are being applied, a preceding object and a succeeding objects in the control flow.

19. The computer implemented system of claim 16, wherein the contexts considered are identified by workflow patterns around the object to which the basic instantiation operations are being applied, the workflow patterns comprising the object to which the basic instantiation operations are being applied, a preceding object and a succeeding objects in the control flow.

20. The non-transitory computer readable medium of claim 17, wherein the contexts considered are identified by workflow patterns around the object to which the basic instantiation operations are being applied, the workflow patterns comprising the object to which the basic instantiation operations are being applied, a preceding object and a succeeding objects in the control flow.

* * * * *